Nov. 30, 1943.          J. F. HANSEN          2,335,510
MOWER ATTACHMENT
Filed July 15, 1942          2 Sheets-Sheet 1

INVENTOR
JOSEPH F. HANSEN
BY
ATTORNEYS

Nov. 30, 1943.          J. F. HANSEN          2,335,510
                       MOWER ATTACHMENT
                    Filed July 15, 1942          2 Sheets-Sheet 2
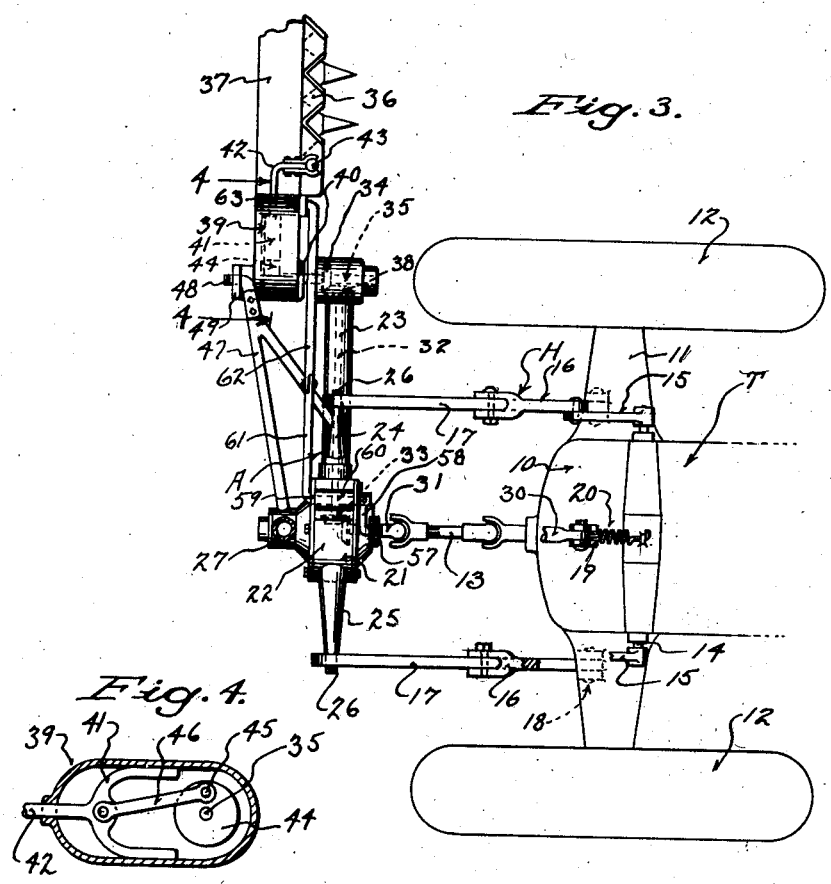
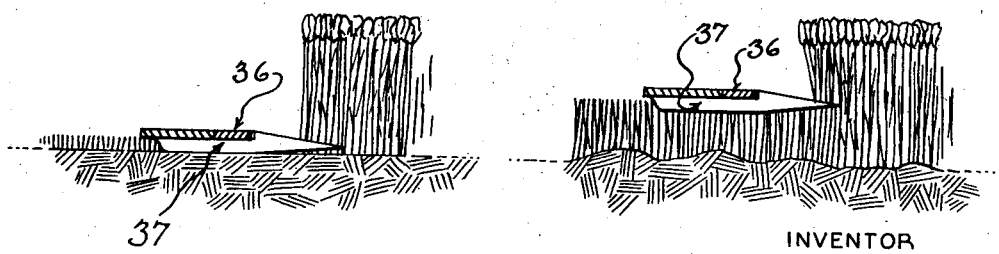
INVENTOR
JOSEPH F. HANSEN
ATTORNEYS Patented Nov. 30, 1943

2,335,510

UNITED STATES PATENT OFFICE 2,335,510

MOWER ATTACHMENT

Joseph F. Hansen, Cleveland, Wis.

Application July 15, 1942, Serial No. 450,962

4 Claims. (Cl. 56—25)

This invention appertains to mowers and more particularly to a novel mower attachment for tractors.

One of the primary objects of my invention is to provide a mower attachment for tractors which can be quickly and easily placed on an existing tractor without any change in the construction of the tractor and without the use of supporting brackets, framework or the like.

Another salient object of my invention is to provide a mower attachment which can be connected to and supported by the hitch of the tractor by the mere use of three fastening bolts or the like.

A further important object of my invention is the provision of means, within easy reach of the operator of the tractor for raising and lowering the mower by the hitch for clearing obstructions and for swinging the mower bar up and down.

A still further object of my invention is the provision of novel means for constructing the mower attachment itself, whereby a compact and durable structure will be had and which will effectively operate under all normal field conditions.

With these and other objects in view, the invention consists in the novel construction, arrangement and formation of parts, as will be hereinafter more specifically described, claimed, and illustrated in the accompanying drawings, in which drawings:

Figure 3 is a top plan view of my novel mower attachment connected to a tractor and hitch parts of the section being broken away.

Figure 4 is an enlarged detail fragmentary sectional view taken on the line 4—4 of Figure 3 looking in the direction of the arrows illustrating the driving mechanism for the reciprocatory cutter knife.

Figure 5 is a detail sectional view showing the mower bar in a lowered position.

Figure 6 is a similar view showing the mower bar raised by the hitch for clearing obstructions.

Figure 1:
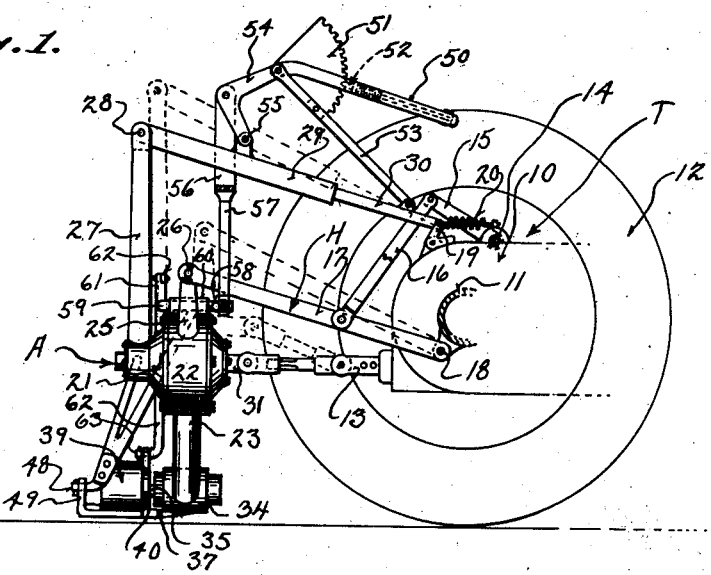
Figure 1 is a fragmentary side elevational view partly in section showing my novel mower attachment connected to a tractor and hitch of a well known type.
Figure 2:
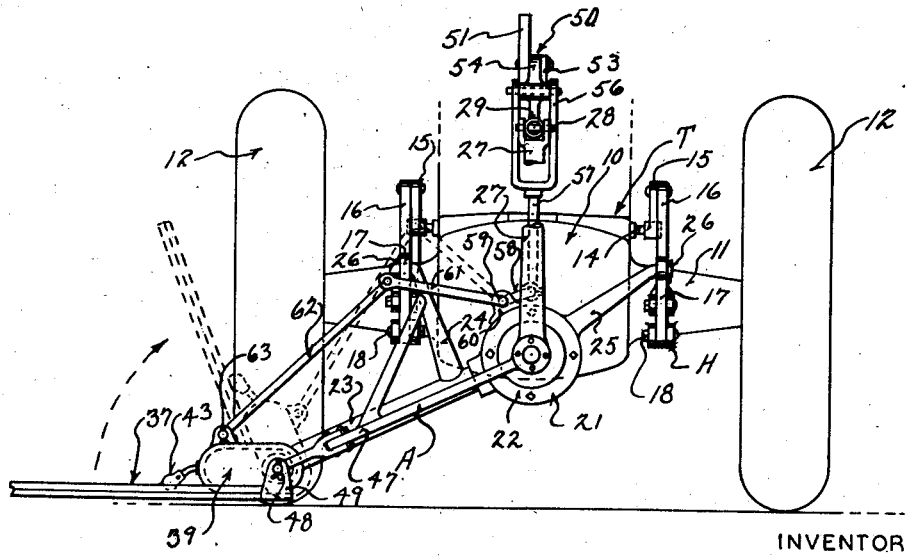
Figure 2 is a fragmentary rear elevational view showing my mower attachment connected with the tractor and hitch.

Referring to the drawings in detail, wherein similar reference characters designate corresponding parts throughout the several views the letter A generally indicates my novel mower attachment for a tractor T. Connected with the tractor T is a hydraulic implement hitch H, which carries the mower attachment A.

The tractor T is of a well known type now found in the open market, namely the Ford tractor and the hitch H is of the well known Ferguson type employed to a large extent on Ford tractors.

As the tractor T is of the usual type the same will not be described in detail but it is to be noted that the same includes a differential housing 10 and laterally extending axle housing 11. The rear wheels 12 of the tractor are carried by shafts which extend into the axle housing 11. The differential casing 10 is provided with a power take-off and I have shown a stub shaft 13 extending outwardly from the differential housing.

As the Ferguson implement hitch is also of a well known type the same will not be described in detail but the same is built on a part of the differential housing 10 and includes a lift shaft 14 connected with the hydraulic operating mechanism (not shown). The lift shaft is provided with lift arms 15 and the outer ends of the arms 15 have pivotally connected therewith lift links 16. The inner ends of the lift links 16 are pivotally connected to the draw bars 17 of the hitch. The inner ends of the draw bars 17 are pivotally connected, as at 18, to lugs on the tractor. By operating the hydraulic lift mechanism the draw bars 17 can be raised and lowered. In rear of the lift shaft 14 the tractor is provided with a hitch part consisting of a lever 19 and a shock absorbing spring 20.

My novel mower appliance is connected with the hitch at only three points, namely with the outer ends of the draw bars 17 and the lever 19.

My improved mower appliance A comprises a supporting frame structure 21 which includes a gear casing 22 and this gear casing 22 has connected rigidly therewith a downwardly and outwardly extending shaft housing 23.

Formed on the shaft housing 23 and on the gear housing 22 are upwardly and outwardly inclined main supporting arms 24 and 25. The upper ends of these arms 24 and 25 have formed thereon or secured thereto outwardly extending bearing pins 26 which are received in the outer ends of the draw bars 17 of the hitch. Accidental displacement of the bearing pins 26 from the draw bars 17 can be prevented in any desired way, such as by the use of removable cotter pins. Extending upwardly from the central casing 22 is a rigid arm 27. The upper end of the arm 27 has pivotally connected thereto as at 28, a telescoping tube 29 and the forward section 30 of the tube is detachably connected, as at 30, to the hitch implement 19 on the tractor. This connection constitutes the third point at which the mower attachment is secured to said tractor. Connected to the power take-off shaft 13 is a drive shaft 31 and this drive shaft 31 preferably includes a universal joint and a sliding section. The drive shaft 31 extends into the gear housing 22 and is operatively connected with a drive shaft 32 rotatably mounted within the shaft housing 23. As suggested in Figure 3, the shaft 31 can be connected to the drive shaft 32 by means of bevelled gears 33. The forward end of the shaft housing 23 carries a bearing sleeve 34 for a transversely extending drive shaft 35 for the cutter knife 36 on the mower bar 37 and the shaft 32 can be connected to the shaft 35 by the use of bevelled gears 38. The mower bar 37 has formed on the inner end thereof a slide box 39 and this slide box is provided with a bearing 40 for the drive shaft 35 and the drive shaft extends into the slide box. Mounted in suitable guides in the slide box is a slide head 41 and this slide head has secured thereto an outwardly extending drive rod 42. The slide box is provided with a guide bearing for the rod and this rod is connected, through the medium of a ball and socket joint 43 with the cutter knife 36. Rigidly fastened to the inner end of the drive shaft 35 is a drive wheel 44 having mounted thereon a crank pin 45. A connecting rod 46 operatively connects the crank pin with the slide head. Other suitable driving means can be employed, if desired.

From the description so far, it can be seen that the shaft 32 of the mower attachment is driven from the power take-off of the tractor and that this shaft in turn operates the drive shaft 35. The drive shaft 35, in turn reciprocates the rod 42 through the crank wheel 44 and slide head 41. This brings about the effective driving of the cutter blade 36.

By operating the hydraulic lift of the Ferguson hitch, the draw bars 17 will lift up on my entire mower appliance for permitting the clearing of obstructions, and the telescoping tube 29 permits the desired sliding action for this movement of the attachment.

Means is provided for further supporting the mower bar and this means can consist of a Y shaped brace bar 47. The inner ends of the arms in the brace bar are rigidly connected to the gear housing 22 and to the supporting arm 24. The outwardly extending leg of the Y shaped brace 47 is provided with bearing pin 48 which is received within a bearing lug 49 formed on the slide box 39.

I have provided a novel mechanism for raising and lowering the mower bar 37 on the pivot 48 and the shaft 35 and this mechanism includes an operating hand lever 50, which is arranged adjacent to the driver's seat on the tractor. The lever 50 is latched to a quadrant rack 51 by means of a hand grip operated pawl or dog 52. This rack 51 is rigidly fastened to a supporting strap 53 that is carried by the inner end of the telescoping tube 29. The inner end of the hand lever 50 has formed thereon a bell crank shaped lever 54 and the lower end of the lever is pivotally mounted as at 55 on a lug carried by the outer section of the telescoping tube 29. Pivotally connected to the bell crank shaped lever 54 at its angle is a yoke 56 and this yoke carries a depending rod 57. The rod 57 is pivotally connected to the crank arm 58 of a crank shaft 59 and this crank shaft is mounted in a bearing 60 secured to the gear housing 22. The crank shaft 59 also has formed thereon an elongated crank arm 61 and this crank arm 61 in turn has pivotally connected thereto a link 62 which is pivotally connected, as at 63, to the slide box 39. The pivot 63 is located beyond the shaft 35 and the pivot pin 48 and consequently by manipulating the hand lever 50 the crank shaft 59 can be rocked by pulling up on the link 62. This will effectively swing the mower bar to an elevated position.

From the foregoing description, it can be seen that I have provided an exceptionally simple, compact and durable mower attachment which can be quickly and conveniently connected with the Ferguson hitch of a Ford tractor.

Changes in detail may be made without departing from the spirit or the scope of my invention, but what I claim as new is:

1. The combination with a tractor having an implement hitch including swinging draw bars, means for raising and lowering the bars, and a hitch member connected with the tractor above said draw bars, of a mower attachment including a frame, diverging arms forming a part of the frame pivotally connected with the outer ends of said draw bars, a sliding connection between the frame and the hitch member, and a mower bar carried by said frame.

2. The combination with a tractor having an implement hitch including swinging draw bars, means for raising and lowering said draw bars, and a hitch member carried by the tractor above the draw bars, of a mower attachment including a frame, diverging attaching arms forming a part of the frame pivotally connected to the outer ends of said draw bars, a telescoping connection carried by the frame secured to the hitch member, a mower bar pivotally carried by the frame, and means carried by the frame for swinging the mower bar on said frame.

3. A combination with a tractor having an implement hitch including swinging draw bars, means for raising and lowering the draw bars and a hitch member carried by the tractor above said draw bars, said tractor having a power take-off, of a mower attachment for the tractor including a frame having a gear casing, a downwardly and laterally extending shaft casing rigidly connected to the gear casing, diverging frame arms connected to the gear casing and to the shaft casing pivotally connected with the outer ends of the draw bars, an upwardly extending rigid arm forming a part of the frame, a telescoping connection between the last mentioned arm and the hitch member, a mower bar hingedly carried by the shaft casing including a reciprocatory cutter knife, a drive shaft including a universal joint connected with the power take-off and extending into the gear casing, means operatively connecting said shaft with the cutter knife and means including a hand lever carried by the telescoping connection for raising and lowering the mower bar.

4. In a mower attachment for tractors, a frame including a gear casing, a downwardly and outwardly inclined shaft casing rigidly secured to the gear casing, upwardly extending diverging attaching arms carried by the gear casing and the shaft casing, an upstanding arm carried by the gear casing and arranged between the diverging arms, a forwardly extending attaching member pivotally secured to the last mentioned arm and including inner and outer slidably connected sections, a mower bar hingedly carried by the outer end of the shaft casing, and means for raising and lowering the mower bar on the frame including a hand lever pivotally carried by the connecting member, a crank connected to the gear casing, means operatively connecting the crank to the mower bar and hand lever, and means for latching the hand lever in a selected adjusted position.

JOSEPH F. HANSEN.